United States Patent
De Smet et al.

(10) Patent No.: US 9,066,285 B2
(45) Date of Patent: Jun. 23, 2015

(54) COMMUNICATION SYSTEM AND METHOD

(75) Inventors: Bruno De Smet, Valbonne (FR); Flavien Delorme, Vence (FR)

(73) Assignee: Nvidia Corporation, Santa Clara, CA (US)

( * ) Notice: Subject to any disclaimer, the term of this patent is extended or adjusted under 35 U.S.C. 154(b) by 119 days.

(21) Appl. No.: 13/345,617

(22) Filed: Jan. 6, 2012

(65) Prior Publication Data
US 2013/0176894 A1    Jul. 11, 2013

(51) Int. Cl.
| | |
|---|---|
| H04W 48/20 | (2009.01) |
| H04W 8/26 | (2009.01) |
| H04L 29/12 | (2006.01) |
| H04W 88/06 | (2009.01) |
| H04L 29/06 | (2006.01) |
| H04L 12/28 | (2006.01) |
| H04L 29/08 | (2006.01) |
| H04L 12/723 | (2013.01) |
| H04L 12/701 | (2013.01) |
| H04W 48/08 | (2009.01) |
| G06F 17/30 | (2006.01) |
| G06F 17/22 | (2006.01) |
| G06F 17/27 | (2006.01) |

(52) U.S. Cl.
CPC ............. *H04W 48/20* (2013.01); *H04W 8/26* (2013.01); *H04W 88/06* (2013.01); *H04L 61/6086* (2013.01); *H04L 61/3075* (2013.01)

(58) Field of Classification Search
CPC ........ H04W 8/26; H04W 76/02; H04W 80/04
USPC .......... 370/254–271, 431–469; 709/220–237, 709/249–253
See application file for complete search history.

(56) References Cited

U.S. PATENT DOCUMENTS

| | | | | |
|---|---|---|---|---|
| 7,762,470 | B2 * | 7/2010 | Finn et al. ...................... | 235/492 |
| 2003/0041302 | A1 * | 2/2003 | McDonald ...................... | 715/513 |
| 2005/0281233 | A1 * | 12/2005 | Parker ............................ | 370/338 |
| 2008/0057957 | A1 * | 3/2008 | Altbaum et al. ............ | 455/435.1 |
| 2011/0013569 | A1 * | 1/2011 | Scherzer et al. .............. | 370/329 |
| 2013/0007291 | A1 * | 1/2013 | Nickols .......................... | 709/228 |
| 2013/0031271 | A1 * | 1/2013 | Bosch et al. ................... | 709/245 |

* cited by examiner

Primary Examiner — Un C Cho
Assistant Examiner — Peian Lou

(57) ABSTRACT

A modem comprising: a wireless transceiver for connecting to a wireless cellular network; second interface apparatus for connecting to a terminal; and processing apparatus which performs operations of a wireless cellular modem to enable the terminal to access a further, packet-based network via access points of the wireless cellular network. The processing apparatus receives a modem command from the terminal, the modem command comprising a field for specifying the name of one of the access points in the form of a text string. The field comprises the names a plurality of the access points and one or more separator characters between them. The processing apparatus is configured to extract each of the names from the field based on the one or more separator characters, and to establish a different respective channel with each of the plurality of access points based on the extracted names.

36 Claims, 4 Drawing Sheets

COMMUNICATION SYSTEM AND METHOD

TECHNICAL FIELD

This application relates to access points that provide access between a wireless cellular network and a further, packet-based network; and to establishing a channel between a modem and an access point, e.g., to access the Internet via a 3GPP network.

BACKGROUND

FIG. 1 is a schematic block diagram of a communication system comprising a host terminal 2 and an external wireless cellular modem 4, the modem 4 comprising an antenna 5. The host terminal 2 may be a user terminal, and may for example take the form of a desktop computer, laptop computer, tablet style computer, or mobile phone (which may be referred to as a "smart phone"). The modem 4 may for example take the form of a dongle for plugging into the host terminal 2. Alternatively the modem 4 may take the form of a mobile phone handset which, as well as being a conventional mobile telephone, can be connected to the host terminal 2 so as to act as an external cellular modem for the host terminal 2. The modem 4 is external to the host terminal 2 in that it is a separate unit housed in a separate casing, but which is connected or connectable to the host terminal 2 by means of a wired or wireless connection (as well as being removable or being able to be disconnected from the host terminal 4). In another alternative set up, the modem 4 could be internal to the terminal 4, e.g., taking the form of a wireless module in a desktop or laptop computer.

The system also comprises a mobile cellular network 6 such as a 3GPP network; and a further, packet-based network 8, such as, a wide area internetwork such as the Internet. The networks are coupled together by one or more gateway routers (not shown). The mobile network 6 comprises a plurality of antennas 10 and a gateway support entity 7 operatively coupled to the gateway routers and the plurality of antennas. For example the gateway support entity may be a GGSN (Gateway GPRS Support Node) in a 2G or 3G system, or an SAE (System Architecture Evolution) gateway in a LTE (Long Term Evolution) system. The GGSN 7 or other such gateway support entity is configured to provide one or more access points 12 which enable a terminal such as the host terminal 2 to access the Internet 8 via the mobile network 6. Each of the access points 12 has a respective name which is used by a terminal 2 and modem 4 to request use of the access point for accessing the Internet 8. The name of an access point may be referred to as the APN (access point name), and the term APN is sometimes used interchangeably with reference to the access point itself. An APN maps to a specific gateway to a specific PDN (packet data network), for a specific service (e.g. Web browsing, MMS or WAP). Several APNs may map to the same gateway. The APN is a name of the gateway or the gateway itself. The gateway may have several names. The APN corresponds to a specific service or a set of services that are provided by one unique gateway.

For connecting to the 3GPP network 6 or other such cellular network, the modem 4 comprises first physical interface apparatus comprising a wireless transceiver, typically in the form of a radio frequency (RF) transceiver and an antenna 5. This interface apparatus of the modem 4 connects via an antenna 10 to the cellular network 6, enabling the modem 4 to establish a channel 20 between itself and one of the access points 12 provided by the GGSN 7 of the cellular network 6. This channel may be referred to as a "context". For example, if the mobile cellular network 6 is a 3GPP network, then the connection between the modem 4 and a 3GPP network 6 may be called a PDP (Packet Data Protocol) context in 2G or 3G terminology, and an EPS (Evolved Packet System) bearer context in LTE (Long Term Evolution standards) terminology. The context 20 comprises parameters for establishing the connection with the access point 12, such as context type, quality-of-service (QoS) parameters, authentication type and information of a domain name system. The physical medium of the connection is typically a radio channel such as a 2G, 3G or LTE radio channel and the protocol that drives it may comprise a set of protocol layers as defined for example by 3GPP. Each of the one or more access points 12 connects on to a router of the Internet 8. The first router encountered on the route onwards from the mobile cellular network 6, i.e. the router immediately connecting to the access point 12, is the gateway between the cellular network 6 and the Internet 8.

For connecting to the host terminal 2, the modem 4 comprises second physical interface apparatus. The second interface, between the host 2 and modem 4, could for example comprise a wired connection such as USB, or a short-range wireless transceiver such as an infrared connection or a radio frequency connection (e.g. Bluetooth).

The host terminal 2 is installed with one or more applications 18 which when executed on the host terminal 2 send and/or receive communications over the Internet 8 via the first and second interface apparatuses, wireless cellular network 6, access point 12 and the relevant gateway, over the established context 20, supported by the GGSN 7. The system allows the host terminal to access the Internet 8 using a suitable packet protocol or communication protocol stack comprising one or more packet protocol layers implemented at the modem 4 and at one or more nodes of the mobile network 6 and Internet 8, e.g. using an Internet Protocol version 6 (IPv6) stack and/or Internet Protocol version 4 (IPv4) stack. The host terminal 2 may be installed with and run one or more applications 18$i$ that operate exclusively based on use of IPv4, one or more applications 18$ii$ that operate exclusively based on use of IPv6, and/or one or more applications 18$i$ configured to make use of a mixture of IPv4 and IPv6 features ("dual-stack connectivity"). To this end, the modem 4 may be operable to establish a context 20$i$ of a type which operates exclusively based on IPv4, to establish a context 20$ii$ of a type which operates exclusively based on IPv6, and/or to establish a context 20$iii$ of a type which can support both IPv4 and IPv6.

Reference is made to 3GPP TS 23.003 section 9.1, 3GPP TS 23.060 section 9.2.1 and 3GPP TS 27.007 section 10.1.1.

SUMMARY

According to one aspect, the disclosure provides a modem for use at a terminal. In one embodiment, the modem includes: first interface apparatus comprising a first wireless transceiver arranged to connect to a wireless cellular network; second interface apparatus arranged to connect to the terminal; and processing apparatus configured to perform operations of a wireless cellular modem so as to enable the terminal to access a further, packet-based network via the second interface apparatus, the first interface apparatus and access points of the wireless cellular network, each access point having a respective name; wherein the processing apparatus is configured to receive a modem command from the terminal via the second interface apparatus, the modem command comprising a field for specifying the name of one of said access points in the form of a text string; wherein said field comprises the names a plurality of said access points and one or more separator characters between each of the names in the field;

and wherein the processing apparatus is configured to extract each of the names of said plurality of access points from said field based on the one or more separator characters, and to establish a different respective channel with each of said plurality of access points based on the names extracted from the field.

According to another aspect, the disclosure provides a computer program product for operating a modem for use at a terminal, the modem having a processing apparatus, a first interface apparatus comprising a first wireless transceiver for connecting to a wireless cellular network, and a second interface apparatus for connecting to the terminal. In one embodiment, the computer program product includes code embodied on a non-transitory computer-readable medium and configured so as when executed on the processing apparatus of said modem to perform operations of a wireless cellular modem so as to enable the terminal to access packet-based communications via the second interface apparatus, first interface apparatus and access points of the wireless cellular network, each access point having a respective name, including to perform operations of: receiving a modem command from the terminal via the second interface apparatus, the modem command comprising a field for specifying the name of one of said access points in the form of a text string, wherein said field comprises the names a plurality of said access points and one or more separator characters between each of the names in the field; extracting each of the names of said plurality of access points from said field based on the one or more separator characters; and establishing a different respective channel with each of said plurality of access points based on the names extracted from the field.

According to yet another aspect, the disclosure provides a method of operating a modem at a terminal, the modem having a first interface apparatus including a first wireless transceiver for connecting to a wireless cellular network, a second interface apparatus for connecting to the terminal, and a processing apparatus configured to perform operations of a wireless cellular modem so as to enable the terminal to access packet-based communications via the second interface apparatus, first interface apparatus and access points of the wireless cellular network, each access point having a respective name. In one embodiment, the method includes: receiving a modem command from the terminal via the second interface apparatus, the modem command comprising a field for specifying the name of one of said access points in the form of a text string, wherein said field comprises the names a plurality of said access points and one or more separator characters between each of the names in the field; extracting each of the names of said plurality of access points from said field based on the one or more separator characters; and establishing a different respective channel with each of said plurality of access points based on the names extracted from the field.

According to yet still another aspect, the disclosure provides a system. In one embodiment, the system includes: a terminal; a wireless cellular network; and a modem for use at the terminal, the modem comprising a first interface apparatus comprising a first wireless transceiver arranged to connect to a wireless cellular network, a second interface apparatus arranged to connect to the terminal, and processing apparatus configured to perform operations of a wireless cellular modem so as to enable the terminal to access a further, packet-based network via the second interface apparatus, the first interface apparatus and access points of the wireless cellular network, each access point having a respective name; wherein the processing apparatus is configured to receive a modem command from the terminal via the second interface apparatus, the modem command comprising a field for specifying the name of one of said access points in the form of a text string; wherein said field comprises the names a plurality of said access points and one or more separator characters between each of the names in the field; and wherein the processing apparatus is configured to extract each of the names of said plurality of access points from said field based on the one or more separator characters, and to establish a different respective channel with each of said plurality of access points based on the names extracted from the field.

BRIEF DESCRIPTION

Reference is now made to the following descriptions taken in conjunction with the accompanying drawings, in which.

DETAILED DESCRIPTION

Figure 1:
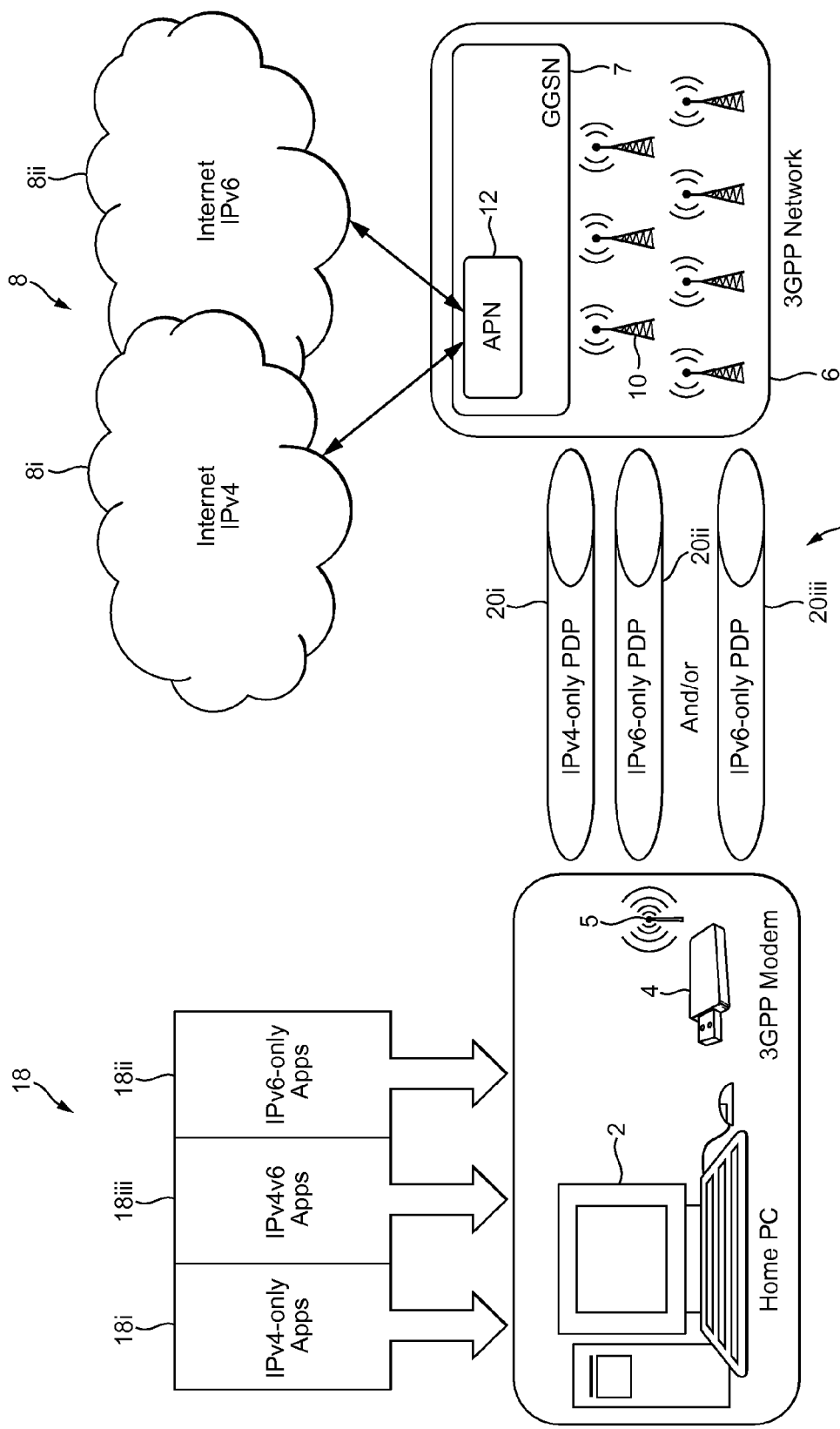
FIG. 1 is a schematic illustration of IPv6 connectivity over 3GPP network.

A problem can occur where a terminal issues a command to its modem with only one given field for specifying a name of an access point, but where circumstances are such that it would in fact be desirable or necessary to establish two or more separate channels each with a different respective access point having different access point names.

For example, a problem of this kind can occur if user equipment operating according to 3GPP Release 8 (or higher) finds itself in a pre-Release-8 network (or connecting through a pre-Release-8 element or portion of the network). Release 8 provides for a context type "IPv4v6" which can handle both IPv4 communications and IPv6 communications over the same context. Therefore when a host terminal 2 configured according to Release 8 (or higher) runs an application 18*iii* which uses a mixture of IPv4 and IPv6, i.e. using dual-stack connectivity, it will issue an AT+CGDCONT command to its modem 4 requesting an IPv4v6 context type and containing only a single field for specifying an access point name (APN). Under expected circumstances, the host 2 will therefore configure one IPv4v6 type context (20*iii*) with one single APN.

However, 3GPP Releases prior to Release 8 did not provide for the IPv4v6 context type, and instead only provided the IPv4-only context type dedicated to IPv4 and the IPv6 context type dedicated to IPv6. Therefore if the modem 4 finds itself in a pre-Release-8 network (or part of a network), it will have to establish two separate IPv4 and IPv6 contexts (20*i* and 20*ii*) with the 3GPP network 6.

Nonetheless, as explained, the IPv4v6 application 20*iii* running on the Release-8 compatible host terminal 2 will have resulted in only one AT+CGDCONT command being issue to the modem 4, with only one single field specifying an access point name. The configurations of the two IPv4 and IPv6 contexts 20*i*, 20*ii* are therefore copied by the modem 4 from the attempted configuration of the IPv4v6 context 20*iii* requested in the AT+CGDCONT command. Hence both the IPv4 and IPv6 contexts will use the same APN. This is what is specified in the 3GPP standards (3GPP TS 23.060 section 9.2.1), i.e. in case of dual-stack connectivity with two single-stack PDP contexts, the mobile station should request the same APN for these two single-stack PDP contexts.

Despite this, some operators have expressed a desire to be able to appoint two separate APNs for the two different IPv4 and IPv6 contexts. One reason could be that the PDNs (packet data networks) 8 the host can be connected to are IPvx-only, e.g. one IPv4-only PDN or network region 18*i* and one IPv6-only PDN or network region 8*ii*; and/or the operator may have not upgraded its gateways to support both IPv4 and IPv6 protocols, but instead might have configured one or more IPv6-only gateway(s) in addition to existing IPv4-only gateway(s). It may be easier or more cost-efficient to proceed this way for some operators.

The 3GPP standards do not currently specify any method to define multiple APNs for multi-stack connectivity.

It will be appreciated that a similar problem could occur wherever a terminal issues a modem command according to a standard that would require only a single channel type to handle two or more versions of a communication protocol, but where the modem finds itself in a network or a part of a network that would require or at least benefit from separate channel types to handle the two or more versions of the protocol.

A person skilled in the art may also find other instances in which a modem receives a command with one given field for specifying an access point name, but in which it would in fact be useful to establish two different channels to two different access point names, or to establish channels to more access point names than are supported by a field of the received command.

Accordingly, the disclosure provides a modem for use at a terminal. In one embodiment, the modem includes a first interface apparatus, a second interface apparatus and processing apparatus. The first interface apparatus includes a first wireless transceiver arranged to connect to a wireless cellular network, wherein the second interface apparatus is arranged to connect to the terminal. The processing apparatus is configured to perform operations of a wireless cellular modem so as to enable the terminal to access a further, packet-based network via the second interface apparatus, the first interface apparatus and access points of the wireless cellular network, with each access point having a respective name. The processing apparatus is configured to receive a modem command from the terminal via the second interface apparatus. The modem command includes a field for specifying the name of one of the access points in the form of a text string, wherein the field includes the names of a plurality of the access points and one or more separator characters between each of the names in the field. The processing apparatus is configured to extract each of the names of the plurality of access points from the field based on the one or more separator characters, and to establish a different respective channel with each of the plurality of access points based on the names extracted from the field In embodiments, the one or more separator characters may comprise a character allowed by an operating system of the terminal for use in specifying names of the access points.

The one or more separator characters may comprise at least two "-" between each of the names in the field. In one embodiment, the one or more separator characters may comprise a character forbidden by the wireless cellular network for use in names of the access points. Additionally, the one or more separator characters may comprise a "/" between each of the names in said field.

Each of the plurality of access points may be configured according to a different version of a packet communication protocol, wherein the plurality of access points include at least a first access point configured according to a first version of the packet communication protocol and a second access point configured according to a second version of the packet communication protocol. The processing apparatus may be configured to establish a first channel with the first access point based on a first of the names extracted from the field, and to establish a second channel with the second access point based on a second of the names extracted from the field.

The processing apparatus may be configured to establish the first channel being of a type dedicated to only the first version. The processing apparatus may be configured to establish the second channel being of a type dedicated to the second version. Each of the channels may include one of a PDP context and an EPS bearer context.

In one embodiment, the plurality of access points may comprise an IPv4 access point, and the processing apparatus may be configured to establish an IPv4-only context type with the IPv4 access point. The plurality of access points may comprise an IPv6 access point, and the processing apparatus may be configured to establish an IPv6-only context type with the IPv6 access point. In another embodiment, the plurality of access points may comprise at least an IPv4 access point and an IPv6 access point, and the processing apparatus may be configured to establish an IPv4-only context type with the IPv4 access point, and to establish an IPv6-only context type with the IPv6 access point. Each of the names may be associated with a different respective set of settings for the respective access point.

In an embodiment, the further network may be the Internet. Additionally, the wireless cellular network may be a 3GPP network. The second interface apparatus may comprise a wired connector or connection and the modem may comprise an external unit for use at the terminal. In one embodiment, the modem may comprise a dongle housing the processing apparatus and for plugging into the terminal via the second interface apparatus. The second interface apparatus may also include a second wireless transceiver for connecting to the terminal via a local wireless connection. The modem may comprise a mobile phone housing the processing apparatus and for connecting to the terminal via the second interface apparatus, the mobile phone thus being operable as a telephone and as an external wireless cellular modem for the terminal.

The disclosure also provides a computer program product for operating a modem for use at a terminal, wherein the computer program product includes code embodied on a non-transitory computer-readable medium and configured so as when executed on the processing apparatus of the modem to perform operations of a wireless cellular modem so as to enable the terminal to access packet-based communications via a second interface apparatus, a first interface apparatus and access points of the wireless cellular network. In embodiments, the code may be configured so as when executed to perform operations in accordance with the operation of any of the possible features of the unit set out above.

Additionally, the disclosure provides a method of operating a modem at a terminal. In embodiments, the method may include operations in accordance with the operation of any of the possible features of the unit set out above. A system including a terminal, a wireless cellular network, and a modem for use at the terminal is also disclosed. In embodiments, the system may be further configured in accordance with any of the possible features of said unit set out above.

Figure 2:
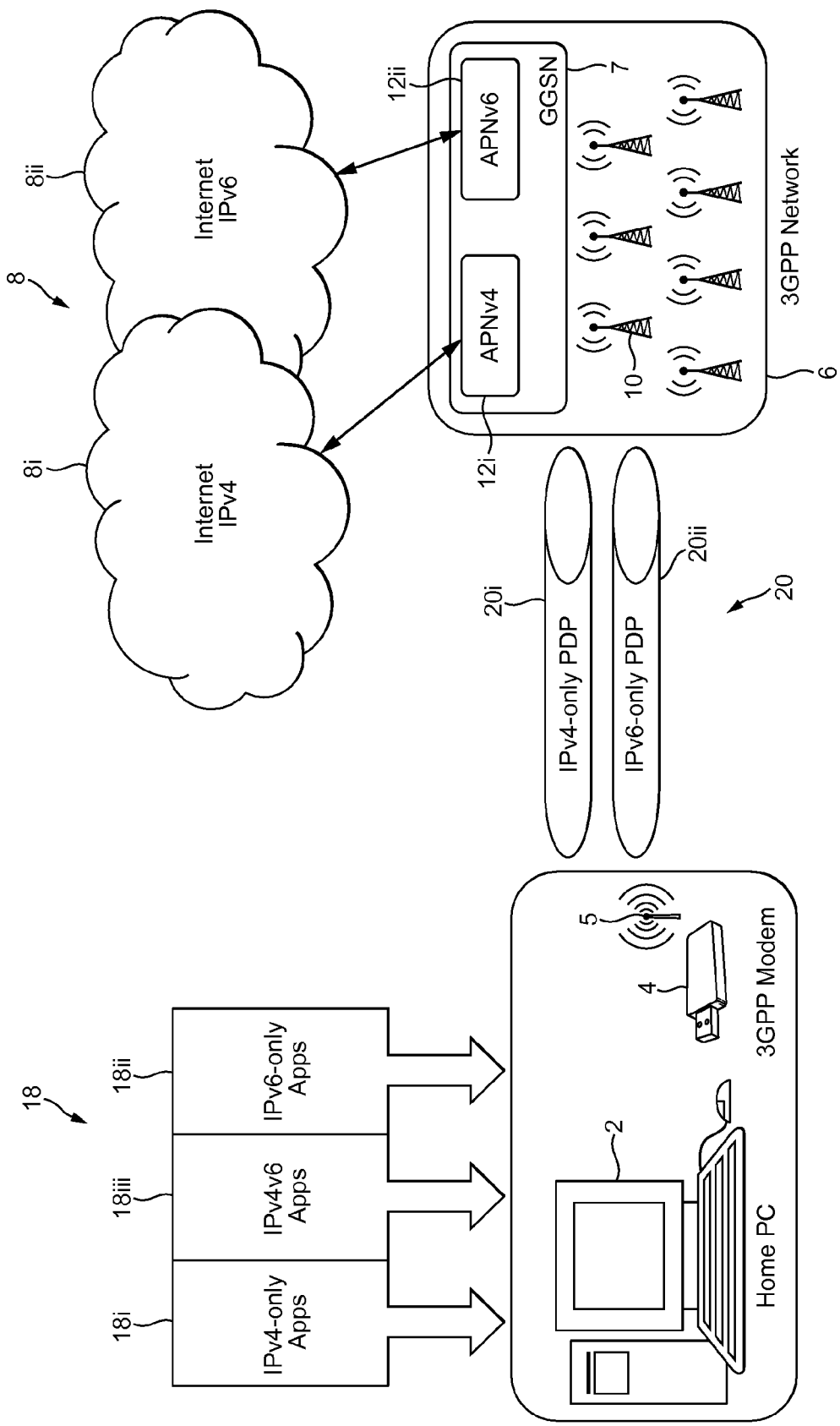
FIG. 2 is another schematic illustration of IPv6 connectivity over 3GPP network.
Figure 4:
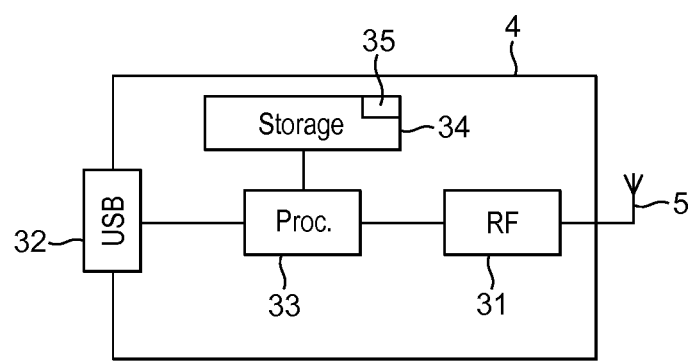
FIG. 4 is a schematic block diagram of an external modem unit for use at a host terminal.

Turning now to FIG. 2, illustrated is a communication system in which embodiments of the disclosure may be applied. The host 2 may be any device such as a PC, laptop, or application processor connected to the modem 4 in order to obtain access to the packet-based network 8 via the modem 4 and cellular network 6, e.g. to get IPv6 connectivity and send and/or receive IPv6 traffic. The modem 4 is the device that provides a way to send and receive packets between the host 2 and cellular network 6, e.g. to send and receive IPv6 packets between the host and the 3GPP network. Referring to FIG. 4, the modem 4 may comprise a processor 33 and, operatively coupled to the processor 33, a non-transitory computer-readable storage medium 34 such as a magnetic or electronic memory storing soft-modem code. The code on the storage medium 34 is arranged to be executed on the processor 33, so as when executed to send and receive packets between the host 2 and Internet 8 or other such packet-based network via the cellular network 6, and to perform the additional operations of the modem 4 as discussed below. However, the possibility of some or all of the modem functionality being implemented in dedicated hardware processing apparatus is not excluded.

As mentioned, the modem 4 may for example take the form of a dongle for plugging into the host terminal 2; or may take the form of a mobile phone handset which, as well as being a conventional mobile telephone, can be connected to the host terminal 2 so as to act as an external cellular modem for the host terminal 2. The modem 4 is external to the host terminal 2 in that it is a separate unit housed in a separate casing, but which is connected or connectable to the host terminal 2 by means of a wired or wireless connection. The modem may be configured in a similar manner to that discussed in relation to FIG. 1 above, but with additional functionality added in accordance with the embodiments disclosed herein, an example of which will be discussed in more detail below in relation to FIGS. 2 and 3.

In one embodiment, the cellular network 6 is a 3GPP network, which connects the modem 4 to the IPv6 network. For connecting to the 3GPP network 6 or other such cellular network, the modem 4 comprises first physical interface apparatus comprising a wireless transceiver 31, typically in the form of a radio frequency (RF) transceiver, and an antenna 5. The transceiver 31 is operatively coupled to the processing apparatus 33. A connection could be made of one or more bearer(s) called PDP context(s).

The connection between the modem 4 and an access point 12 of the cellular 3GPP network, and therefore between the modem 4 and gateway to the IPv6 network 8, comprises one or more contexts 20 in the form of one or more PDP contexts or one or more EPS bearer contexts. In embodiments, each context may provide a point-to-point connection between the modem 4 and the access point 12.

For connecting the external modem 4 to its host terminal 2, the modem 4 comprises second physical interface apparatus 32 operatively coupled to the processing apparatus 33. This second interface 32, between the host 2 and modem 4, could for example comprise a wired connection such as USB, or a short-range wireless transceiver such as an infrared connection or a radio frequency connection (e.g. Bluetooth).

A PDP context is a data channel between the 3 GPP modem 4 and the access point 12. It comprises a set of parameters including the following.

The PDP type, which can be any of
  IPv4 (IPv4 traffic only),
  IPv6 (IPv6 traffic only), or
  IPv4v6 (both IPv4 and IPv6 traffic allowed). This latter type has only been available from Release 8 of the 3GPP specifications onwards.
The APN (access point name) which takes the form of a string. Characters currently allowed for the APN string are:
  characters (A-Z and a-z),
  digits (0-9), and
  the hyphen (-).
  . . . And other parameters In one embodiment, the configuration of a context 20 is done by the host terminal 2 (e.g. home PC, laptop, tablet, smartphone), e.g. by an application running on the host 2 or by an operating system running on the host 2 in order to service an application 18 running on the operating system on the host 2. In 3GPP TS 27.007, "command set for User Equipment (UE)", section 10.1.1, the 3GPP standard specifies an AT command (+CGDCONT) that defines one unique APN and one unique PDP type per PDP context. The APN name is a string of characters that follows '+CGDCONT', e.g. "myAPN". See also 3GPP TS 23.003, "Numbering, addressing and identification", section 9.1. The host terminal 2 thus configures a context 20 by sending an AT+CGDCONT to the modem 4, via the second interface apparatus 32 (e.g. USB connection).

However, there is a potential issue when a Release8 (or higher) user equipment meets a pre-Release8 network or part of a network.

In the 3GPP standard (3GPP TS 23.060 section 9.2.1), it is specified that in case of dual-stack connectivity with two single-stack PDP contexts 20*i*, 20*ii*, the mobile station should request the same APN for these two single-stack PDP contexts.

That is, if the host 2 is running an IPv4v6 application 18*iii* which uses a mixture of IPv4 and IPv6 features, the host 2 will attempt to configure one single IPv4v6 PDP context 20*iii* with one single APN 12 in accordance with Release 8 (see FIG. 1)

But, when connecting to network equipment of network 6 that is only configured according to 3GPP Release 7 (or earlier), then IPv4+IPv6 connectivity requires two separate PDP contexts, one IPv4-only context 20*i* and one IPv6-only context 20*ii*, instead of one IPv4v6 PDP context.

In this case, the user equipment UE (3GPP modem 4) will therefore have to establish two separate PDP contexts (one IPv4 and one IPv6) with the 3GPP network 6. The modem 4 is configured to copy the configurations of these two PDP contexts 20*i* and 20*ii* from the configuration of the attempted IPv4v6 PDP context requested by the AT+CGDCONT command from the host 2. This means both PDP contexts 20*i*, 20*ii* will use the same APN 12.

However it would be convenient and useful in relation to some networks to use different APNs, as shown in FIG. 2. The current versions of the 3GPP standard do not currently specify any method to define several APN for multi-stack connectivity and a fortiori for dual-stack connectivity.

In some embodiments, the disclosure provides a method that defines several APNs in case of multi-stack connectivity. This method is backward compatible with the current version of 3GPP standard and all previous versions.

The solution provided according to one embodiment is to include multiple APN names in the APN name field of the command to the modem requesting establishment of the context (e.g. the AT+CGDCONT), but separated by one or more separator characters also included in that field between each of the multiple names. The field could just include two APNs, e.g. one for a dedicated IPv4 APN and one for a dedicated IPv6 APN—e.g. see APNs 12*i* and 12*ii* illustrated schematically in FIG. 2. Alternatively, this technique could be used to include any number of APNs up to an arbitrary number n limited only by any maximum size imposed by the modem command in question on the APN field.

The modem 4 will then be configured to extract the individual APNS from the APN field of the command received from the host 2. The modem 4 is able to identify the individual APNs from the APN field by determining where the separator characters or patterns of separator characters fall and knowing that individual APNs lie between these characters or patterns. The modem 4 then formulate separates context request messages to send on to the GGSN 7 (or such other gateway support entity) based on each of the individual extracted APNs respectively. Thus the modem 4 is able to establish separate contexts 20*i* and 20*ii* each to a separate respective access point 12*i* and 12*ii* each having a different respective name, despite the fact that only a command having a single APN field has been received at the modem 4 from the host 2. For example, when establishing multi-stack connectivity in a pre-Release8 network, this technique could be used to establish an IPv4-only type context 20*i* with a first APN 12*i* configured especially to handle IPv3 communications, and to establish a separate IPv6-only context 12*ii* with a second APN 12*ii* configured especially to handle IPv6 communications.

The composite APN string for use in the APN field could for example be pre-configured in the operating system installed on the host terminal 2, or could be provided to it in an update from one of the networks 6 or 8, or could be configured manually by the user (most operating systems allow manual entry of the APN string).

Some characters are forbidden by the 3 GPP network 6 for use within the APN name. In one embodiment, the method consists in using one of these characters as a separator. The string that defines several APNs will match the following example:
"myAPN1/myAPN2/[ . . . ]/myAPNn"
in case of n APNs, where '/' is used as a separator (the dots in square brackets of course are just used illustratively for the purpose of this description to represent any other APN name or names and any other separator characters between them that might be included in this field). For instance in an example where n=2, APNv4 may be used as APN 12*i* for the IPv4 PDP context 20*i*, and APNv6 may be used as APN 12*ii* for the IPv6 PDP context 20*ii*.

This therefore allows several APNs to be defined for example with an AT+CGDCONT command using a specific syntax. Using this syntax, two or more APNs could be defined.

However, the operating system on the host 2 may also forbid the use of some characters such as the '/' for use in configuring an APN name field. In this case the separator may need to be a pattern of consecutive characters that are allowed by the 3GPP network for use in APN names, but with the pattern being one that is unlikely to occur in a real APN. One such separator pattern would be three consecutive dashes, i.e. '---'. In this case the AT+CGDCONT command (or such like) would contain the following field:
"myAPN1---myAPN2---[ . . . ]---myAPNn"
in case of n APNs. Again in an example where n=2, APNv4 may be used as APN for the IPv4 PDP context 20*i* and APNv6 may be used as APN for the IPv6 PDP context 20*ii*.

Generally the separator character or characters should be recognized or allowed (at least not be explicitly forbidden) by the software on the host 2 that formulates the modem command (e.g. AT+CGDCONT command), e.g. the operating system, and may or may not be forbidden by the mobile network 6. In some embodiment, the character would be allowed by the operating system but forbidden by the mobile network 6 so that there is no chance the separator character or pattern of separator characters would happen to occur in an actual APN. However, that may not be possible. For example the '/' is forbidden by 3GPP but also by at least one common operating system.

Based on this consideration, in one embodiment the separator for use in relation to current 3GPP systems is a least two consecutive '-' characters (a single dash is too likely to be used in an actual APN name), e.g. three dashes '---'.

Figure 3:
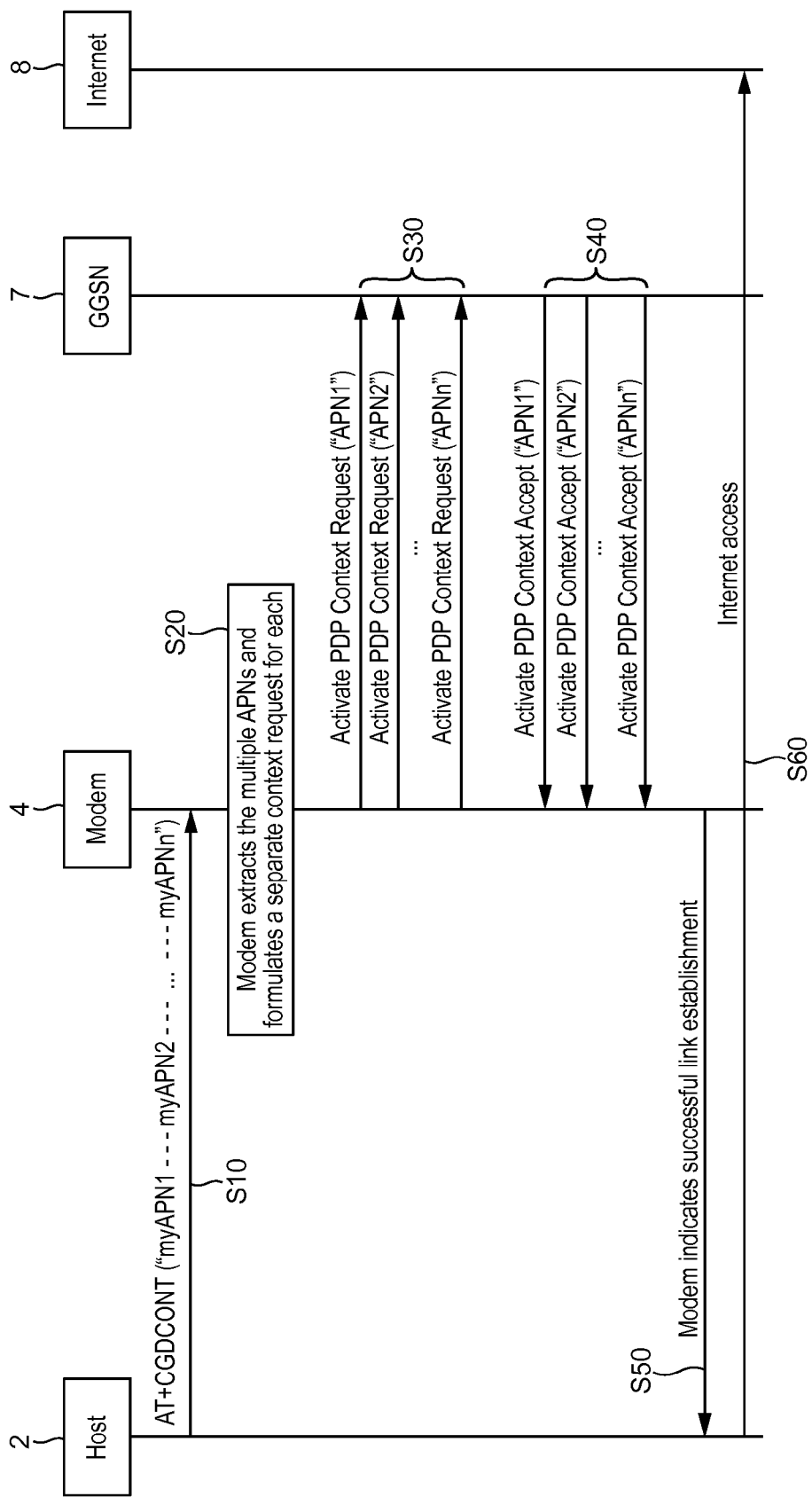
FIG. 3 illustrates a signalling chart of an embodiment of a method of establishing a plurality of contexts carried out according to the principles of the disclosure.

FIG. 3 is a signalling chart illustrating a method according to an embodiment of the disclosure. In one embodiment, the method is implemented in the form of extractor code 35 stored on a non-transitory computer-readable medium 34 of the modem 4 (not necessarily the same physical memory device as the rest of the soft modem code, though it could be) and arranged for execution on the processor 33 of the modem 4 so as when executed to perform the operations of the modem 4 described herein. However, the possibility of some or all of the functionality of the extractor 35 being implemented in dedicated hardware is not excluded.

At step S10 the host 2 (e.g. the operating system running on the host 2 servicing a dual- or multi-stack application 18*iii*) generates and issues a command to the modem 4 requesting establishment of a context 20 (or configuration of an existing context), e.g. AT+CGDCONT. The command is issued to the modem 4 via the second interface apparatus 32 (e.g. USB connection). The host 2 formulates the command so as to contain, in a text field taking a string for identifying an APN, a string that in fact comprises multiple APNs separated by one or more separator characters between them as discussed above. For example the command may comprise:
AT+CGDCONT ( . . . "myAPN1---myAPN2---[ . . . ]---myAPNn" . . . )
(the command may of course comprise other fields, but for simplicity these are not shown).

At step S20, the extractor 35 running on the modem 4 interrogates the string so as to identify the separator characters or patterns of separator characters, e.g. in the above example to find where in the string the consecutive sequence of three dashes ('---') occurs. The modem 4 then determines that remaining portions of the string lying before and after those separators comprise individual APNs. In the example shown, these are the portions of the string in said field that lie directly before the first separator (in this case the first pattern of separator characters), and in the field directly after the last separator, and if there are more than two APNs contained in the string then any portions that start and end directly between two separators.

The extractor 35 running on the modem 4 then uses the extracted names to generate a separate request message for each requesting establishment of a separate respective context each with a respective corresponding access point 12. So if there are n extracted APNs, the extractor will formulate n context request messages.

At step S30, the modem 4 sends each of the n context request messages to the GGSN 7 (or other such gateway support entity), where n is equal to or greater than 2. At step S40, the GGSN 7 responds by returning acceptance messages accepting each of the n contexts, and the contexts are thus established, e.g. one IPv4 type context 20*i* with an IPv4 APN 12*i* and one IPv6 type context with an IPv6 APN 12*ii*, as discussed.

At step S50 the modem 4 confirms to the host 2 (e.g. to its operating system) that a link has been successfully established with an APN 12. In embodiments the modem 4 could inform the host 2 that it has established the n separate contexts so that the host can explicitly select to use each of them individually itself as and when required. Alternatively, the modem 4 could present the host 2 with the illusion that a single context has been successfully established, e.g. a single IPv4v6 context, and the extractor 35 running on the modem 4 would be configured to intercept any attempts to communicate messages between the host 2 and the fictional IPv4v6 context and to translate them into messages on one or more of the n individual contexts, e.g. one or more of the IPv4 only context 20*i* and the IPv6-only context 20*ii*.

Either way, the one or more applications running on the host 2, e.g. the IPv4v6 application 18*iii*, uses the established contexts to access the internet at Step S60, e.g. to access a website or send or receive an email.

It will be appreciated that the above embodiments have been described only by way of example, and other variants or applications may be apparent to a person skilled in the art given the disclosure herein.

For instance, while embodiments above have been described in relation to certain standards such as 3GPP networks, Internet Protocol, IPv6 and so forth, these are not intended to be limiting and the disclosure may in fact be applied within any communication standard of any mobile cellular network, and of any further, packet-based network if such a network is involved. Further, while the above has been described in terms of a GGSN, it will be understood that this is only exemplary and the above description could equally be made by reference to any gateway support entity. For example in an LTE core network, the gateway support entity could be an SAE gateway rather than a GGSN. Further, the term "access point name" or such like does not necessarily imply the APN of any particular standard such as a 3GPP standard. Nor do the terms "context" or "channel" imply a specific nature or standard, but can be used to refer to any kind of suitable data conduit or session established between a modem and a network. Further, the disclosure is not limited to any one specific protocol for issuing commands from the host terminal to the modem, and the AT+CGDCONT command is only used above by way of example.

Generally, the disclosed embodiments are applicable in any scenario where a terminal issues a command to its modem with a given field for specifying a name of an access point, but where it would in fact be desirable or necessary or to establish channels to more access point names than are supported by that field of the command. For instance, the disclosed embodiments could apply in any situation where a terminal issues a modem command according to a standard that would require only a single channel type to handle two or more versions of a communication protocol, but where the modem finds itself in a network or a part of a network that would require or at least benefit from separate channel types to handle the two or more versions of the protocol. A person skilled in the art given the disclosure herein may also find other applications in which it would be useful to split one given field of a modem command to extract multiple names for multiple access points.

Note also that while the above has been described in terms of an external modem housed in a separate unit than the host terminal, the modem could alternatively be embedded in a desktop or laptop computer or even in a tablet or smartphone. In this case the second interface apparatus would be a wired interface such as a bus or dedicated interconnect internal to the host's housing, between a central processing unit of the host 2 and the modem 4 implemented on different chips. The same problem could well still occur if the modem and the terminal's CPU (or the operating system running on it) are not tightly coupled with a proprietary interface between them, e.g. if the modem and the host's operating system are running on different processors and/or different chips communicating together through interfaces such as for example Dialup or Ethernet Adaptor. The features disclosed herein could find an application in an internal modem in this kind of set up. Such a scenario could occur for example where the modem 4 takes the form of an internal wireless data card in a laptop or desktop computer, e.g. installed as a non-proprietary add-on by the user (not provided by the maker of the host terminal 2 itself and/or its operating system).

The present invention is not limited by the described examples but only by the appended claims.

What is claimed is:

1. A modem for use at a terminal, the modem comprising:
   first interface apparatus comprising a first wireless transceiver arranged to connect to a wireless cellular network;
   second interface apparatus arranged to connect to the terminal; and
   processing apparatus configured to perform operations of a wireless cellular modem so as to enable the terminal to access a further, packet-based network via the second interface apparatus, the first interface apparatus and a plurality of access points of the wireless cellular network, each of the plurality of access points of the wireless cellular network having a respective name;
   wherein each of said plurality of access points is configured according to a different version of a packet communication protocol, said plurality of access points comprising at least a first access point configured according to a first version of the packet communication protocol and a second access point configured according to a second version of the packet communication protocol;
   wherein the processing apparatus is configured to receive a modem command from the terminal via the second interface apparatus, the modem command comprising a field for specifying the name of one of said plurality of access points in the form of a text string;
   wherein said field comprises a plurality of names, wherein in each name corresponds to one of said plurality of access points of the wireless cellular network and one or more separator characters between each of the names in the field; and
   wherein the processing apparatus is configured to extract each of the names of said plurality of access points from said field based on the one or more separator characters, and to establish a first channel with the first access point based on a first of the names extracted from said field, and establish a second channel with the second access point based on a second of the names extracted from said field.

2. The modem of claim 1, wherein the one or more separator characters comprise a character allowed by an operating system of said terminal for use in specifying names of the plurality of access points.

3. The modem of claim 2, wherein the one or more separator characters comprise at least two "-" between each of the names in said field.

4. The modem of claim 1, wherein the one or more separator characters comprise a character forbidden by the wireless cellular network for use in names of the plurality of access points.

5. The modem of claim 4, wherein the one or more separator characters comprise a "/" between each of the names in said field.

6. The modem of claim 1, wherein the processing apparatus is configured to establish the first channel being of a type dedicated to only the first version.

7. The modem of claim 6, wherein the processing apparatus is configured to establish the second channel being of a type dedicated to the second version.

8. The modem of claim 1, wherein each of the channels comprises one of a packet data protocol (PDP) context and an evolved packet system (EPS) bearer context.

9. The modem of claim 8, wherein said plurality of access points comprises an Internet Protocol version 4 (IPv4) access point, and the processing apparatus is configured to establish an IPv4-only context type with the IPv4 access point.

10. The modem of claim 8, wherein said plurality of access points comprises an Internet Protocol version 6 (IPv6) access point, and the processing apparatus is configured to establish an IPv6-only context type with the IPv6 access point.

11. The modem of claim 8, wherein said plurality of access points comprises at least an IPv4 access point and an IPv6 access point, and the processing apparatus is configured to establish an IPv4-only context type with the IPv4 access point, and to establish an IPv6-only context type with the IPv6 access point.

12. The modem of claim 1, wherein each of the names is associated with a different respective set of settings for the respective access point.

13. The modem of claim 1, wherein the further network is the Internet.

14. The modem of claim 1, wherein the wireless cellular network is a 3GPP network.

15. The modem of claim 1, wherein the second interface apparatus comprises a wired connector or connection.

16. The modem of claim 1, wherein the modem comprises an external unit for use at the terminal.

17. The modem of claim 16, wherein the second interface apparatus comprises a wired connector.

18. The modem of claim 16, wherein the modem comprises a dongle housing said processing apparatus and for plugging into said terminal via the second interface apparatus.

19. The modem of claim 16, wherein the second interface apparatus comprises a second wireless transceiver for connecting to the terminal via a local wireless connection.

20. The modem of claim 1, wherein the modem comprises a mobile phone housing said processing apparatus and for connecting to said terminal via the second interface apparatus, the mobile phone thus being operable as a telephone and as an external wireless cellular modem for the terminal.

21. A computer program product for operating a modem for use at a terminal, the modem having a processing apparatus, a first interface apparatus comprising a first wireless transceiver for connecting to a wireless cellular network of a single service provider, and a second interface apparatus for connecting to the terminal;
wherein the computer program product comprises code embodied on a non-transitory computer-readable medium and configured so as when executed on the processing apparatus of said modem to perform operations of a wireless cellular modem so as to enable the terminal to access packet-based communications via the second interface apparatus, first interface apparatus and a plurality of access points of the wireless cellular network, each of the plurality of access points having a respective name and configured according to a different version of a packet communication protocol, said plurality of access points comprising at least a first access point configured according to a first version of the packet communication protocol and a second access point configured according to a second version of the packet communication protocol, including to perform operations of:
receiving a modem command from the terminal via the second interface apparatus, the modem command comprising a field for specifying the name of one of said plurality of access points in the form of a text string, wherein said field comprises a plurality of names, wherein in each name corresponds to one of said plurality of access points of the wireless cellular network and one or more separator characters between each of the names in the field;
extracting each of the names of said plurality of access points from said field based on the one or more separator characters; and
establishing a first channel with the first access point based on a first of the names extracted from said field, and establishing a second channel with the second access point based on a second of the names extracted from said field.

22. The computer program product of claim 21, wherein the one or more separator characters comprise a character allowed by an operating system of said terminal for use in specifying names of the plurality of access points.

23. The computer program product of claim 22, wherein the one or more separator characters comprise at least two "-" between each of the names in said field.

24. The computer program product of claim 21, wherein the one or more separator characters comprise a character forbidden by the wireless cellular network for use in names of the plurality of access points.

25. The computer program product of claim 24, wherein the one or more separator characters comprise a "/" between each of the names in said field.

26. The computer program product of claim 21, wherein the code is configured so as when executed to establish the first channel being of a type dedicated to only the first version.

27. The computer program product of claim 26, wherein the code is configured so as when executed to establish the second channel being of a type dedicated to the second version.

28. The computer program product of claim 21, wherein each of the channels comprises one of a packet data protocol (PDP) context and an evolved packet system (EPS) bearer context.

29. The computer program product of claim 28, wherein said plurality of access points comprises an Internet Protocol version 4 (IPv4), and the code is configured so as when executed to establish an IPv4-only context type with the IPv4 access point.

30. The computer program product of claim 28, wherein said plurality of access points comprises an Internet Protocol version 6 (IPv6) access point, and the code is configured so as when executed to establish an IPv6-only context type with the IPv6 access point.

31. The computer program product of claim 28, wherein said plurality of access points comprises at least an IPv4 access point and an IPv6 access point, and the code is configured so as when executed to establish an IPv4-only context type with the IPv4 access point, and to establish an IPv6-only context type with the IPv6 access point.

32. The computer program product of claim 21, wherein each of the names is associated with a different respective set of settings for the respective access point.

33. The computer program product of claim 21, wherein the further network is the Internet.

34. The computer program product of claim 21, wherein the wireless cellular network is a 3GPP network.

35. A method of operating a modem at a terminal, the modem having a first interface apparatus comprising a first wireless transceiver for connecting to a wireless cellular network, a second interface apparatus for connecting to the terminal, and a processing apparatus configured to perform operations of a wireless cellular modem so as to enable the terminal to access packet-based communications via the second interface apparatus, first interface apparatus and a plurality of access points of the wireless cellular network, each of the plurality of access points of the wireless cellular network having a respective name; wherein the method comprises:

receiving a modem command from the terminal via the second interface apparatus, the modem command comprising a field for specifying the name of one of said plurality of access points in the form of a text string, wherein said field comprises a plurality of names, wherein in each name corresponds to one of said plurality of access points of the wireless cellular network and one or more separator characters between each of the names in the field, wherein each of said plurality of access points is configured according to a different version of a packet communication protocol, said plurality of access points comprising at least a first access point configured according to a first version of the packet communication protocol and a second access point configured according to a second version of the packet communication protocol;

extracting each of the names of said plurality of access points from said field based on the one or more separator characters; and establishing a first channel with the first access point based on a first of the names extracted from said field, and establishing a second channel with the second access point based on a second of the names extracted from said field.

36. A system comprising:

a terminal;

a wireless cellular network; and a modem for use at the terminal, the modem comprising a first interface apparatus comprising a first wireless transceiver arranged to connect to a wireless cellular network, a second interface apparatus arranged to connect to the terminal, and processing apparatus configured to perform operations of a wireless cellular modem so as to enable the terminal to access a further, packet-based network via the second interface apparatus, the first interface apparatus and a plurality of access points of the wireless cellular network, each of the plurality of access points of the wireless cellular network having a respective name;

wherein each of said plurality of access points is configured according to a different version of a packet communication protocol, said plurality of access points comprising at least a first access point configured according to a first version of the packet communication protocol and a second access point configured according to a second version of the packet communication protocol;

wherein the processing apparatus is configured to receive a modem command from the terminal via the second interface apparatus, the modem command comprising a field for specifying the name of one of said plurality of access points in the form of a text string;

wherein said field comprises a plurality of names, wherein in each name corresponds to one of said plurality of access points of the wireless cellular network and one or more separator characters between each of the names in the field; and wherein the processing apparatus is configured to extract each of the names of said plurality of access points from said field based on the one or more separator characters, and to establish a first channel with the first access point based on a first of the names extracted from said field, and establish a second channel with the second access point based on a second of the names extracted from said field.

* * * * *

UNITED STATES PATENT AND TRADEMARK OFFICE
CERTIFICATE OF CORRECTION

PATENT NO. : 9,066,285 B2  Page 1 of 1
APPLICATION NO. : 13/345617
DATED : June 23, 2015
INVENTOR(S) : Bruno De Smet and Flavien Delorme It is certified that error appears in the above-identified patent and that said Letters Patent is hereby corrected as shown below:

In the Claims

In column 14, Claim 29, line 39, after --(IPv4)-- please insert the words --access point--

Signed and Sealed this
Twenty-fourth Day of November, 2015

Michelle K. Lee
*Director of the United States Patent and Trademark Office*